United States Patent [19]

Bottillo

[11] Patent Number: 4,738,564

[45] Date of Patent: Apr. 19, 1988

[54] NUCLEAR AND TOXIC WASTE RECYCLING PROCESS

[76] Inventor: Thomas V. Bottillo, 104 Perth St., Bridgeport, Conn. 06606

[21] Appl. No.: 893,677

[22] Filed: Aug. 6, 1986

Related U.S. Application Data

[63] Continuation-in-part of Ser. No. 641,323, Jan. 28, 1985.

[51] Int. Cl.$^4$ ............................................. B09B 3/00
[52] U.S. Cl. ................................ 405/128; 405/129; 405/303; 252/626; 252/631
[58] Field of Search ............... 405/128, 129, 52, 53; 252/633, 626, 631, 632

[56] References Cited

U.S. PATENT DOCUMENTS

| | | | |
|---|---|---|---|
| 3,526,279 | 9/1970 | Colburn | 405/128 X |
| 4,178,109 | 12/1979 | Krutenat | 405/128 |
| 4,400,314 | 8/1983 | Ellis et al. | 405/128 X |
| 4,430,256 | 2/1984 | Rustum | 405/128 X |

FOREIGN PATENT DOCUMENTS

| | | | |
|---|---|---|---|
| 2742340 | 3/1979 | Fed. Rep. of Germany | 405/128 |
| 0140644 | 3/1980 | Fed. Rep. of Germany | 405/128 |
| 2034509 | 6/1980 | United Kingdom | 405/128 |

OTHER PUBLICATIONS

Nuclear Waste Disposal: Is There a Safe Solution?, Civil Engineering ASCE, May 1979, pp. 72–79.

*Primary Examiner*—Dennis L. Taylor
*Attorney, Agent, or Firm*—Perman & Green

[57] ABSTRACT

A new and useful process for the safe and convenient disposal of nuclear and toxic wastes. Such wastes are containerized and deposited in active volcanoes containing molten lava, the weight of the filled waste containers being sufficient to sink into the molten lava to cause the heat to dissolve or consume the containers and waste contents and render the latter harmless through dissipation and dilution into the huge mass of lava present.

2 Claims, No Drawings

NUCLEAR AND TOXIC WASTE RECYCLING PROCESS

BACKGROUND OF THE INVENTION

The present application is a continuation-in-part of copending application, Ser. No. 641,323, filed on Jan. 28, 1985.

Nuclear and toxic wastes are hazardous materials which are dangerous to the health and safety of the public, and the safe and economical disposal of these wastes presents important problems to mankind.

Hospitals, universities and the military generate large volumes of nuclear waste. Factories generate large volumes of toxic waste. With time, these materials become harmless but in the meantime, the safe storage thereof presents important problems.

Attempts to bury toxic wastes and nuclear wastes have failed in many cases, due to the escape of the wastes, such as dioxin, into ground water and/or leaching to the surface of the soil.

Also, attempts to bury such wastes in the oceans, such as by sinking obsolete nuclear submarines, results in a pollution of the oceans.

It has been proposed to dispose of nuclear and toxic wastes by drilling boreholes into tetonic plates, adjacent the nondescending earth crust, and loading elongate cylinders or spheres of the waste materials into the bores for conduction into the center of earth. Reference is made to U.S. Pat. No. 4,178,109 as illustrative of such proposals.

Such proposals are unsatisfactory for a number of reasons. The huge volume of waste requiring disposal makes it impractical to use this method since artificial bore holes must be formed to receive the waste and since the filled bore holes reenter the earth at the rate of only about 6 centimeters per year. Thus, unless the bore holes are formed and filled deep within the earth's crust, the waste materials remain present to contaminate the environment for a great many years.

The ever-increasing pressure of the problem of waste disposal, the expense involved and the confusion over government regulations is currently resulting in many instances of illegal dumping and/or irresponsible dumping of these wastes which have and will continue to result in dangers to the health of the population and to the environment.

SUMMARY OF THE INVENTION

The present invention relates to a relatively simple, convenient and inexpensive method for the disposal of nuclear and toxic wastes, taking advantage of the geographic locations and huge volumes of active volcanoes and the properties which nature has bestowed upon them. According to the present method, nuclear and/or toxic waste is collected, containerized so as to have a sufficient weight to sink below the surface of the molten lava present in active volcanoes, and then deposited into such active volcanoes and molten lava where the intense heat dissolves or consumes the containers and contents to become a part of the massive volume of the molten lava present within the volcano.

The intense heat of the molten lava results in a molecular breakdown of toxic and nuclear chemicals so that toxicity is destroyed and radioactivity is dispersed within the massive volume of the molten lava to provide a safe concentration or intensity which is substantially as safe as that found in the natural state of ores and minerals. For example, natural uranium ores contain only about 0.02% to 4% of uranium and the radioactivity thereof poses little danger to health even if such concentration is doubled. Similarly, radium is present in the natural mineral carnotite and 150 tons of this harmless are required to produce one gram of pure radium. Carnotite remains substantially harmless and safe to exposure even when the radium content is increased to 100 grams or more per 150 tons. The present process, in effect, redeposits radioactive chemicals in diluted, safe concentrations within molten rock so that even the possible escape of the lava from the active volcanoes poses no substantially greater danger than the natural occurrence of ores containing uranium, radium or other radioactive materials since the waste materials are diluted and since the lava quickly solidifies. Eventually, active volcanoes lose their activity and become solid, permanent repositories for the toxic and nuclear wastes deposited therein.

The radioactive nuclear materials used by man were mined in the form of safe, natural ores and minerals. An ideal solution to the problem of disposing of radioactive materials produced from such ores and minerals, after they have served their purpose to mankind, is to redeposit them in a natural environment, such as lava. An active volcano is a natural furnace of the Earth in which intense heat is concentrated in the molten lava and is sufficient to break down toxic chemicals into harmless elements and to dilute and dissipate radiocative chemicals which are diluted into the massive volume of the molten lava present in the volcano, extending deep within the Earth. The present invention takes advantage of the open mouth or crater of a volcano as an opening to the natural intense heat within the Earth, and takes advantage of the existence of molten lava as a liquid heat vehicle for the reception, consumption, destruction and dilution of toxic and radioactive waste materials.

The means used to deposit the present containerized waste materials will be obvious to those skilled in the art in the light of the present disclosure. One suitable method involves transporting the containers to the mouth of the volcano and then lowering them into the lava by means of a cable which is strung across the mouth of the volcano. The containers are released from the cable into the molten lava and sink below the surface, due to their weight, for consumption and dissipation within the lava volume.

The containers useful according to the present invention are those of the type conventionally used for the safe containment of nuclear and toxic wastes since such containers are inherently resistant to rapid destruction upon contact with molten lava, including containers formed from concrete, thick steel, thick lead, heat-resistant plastics, porcelain, etc. Some such containers are lined with heat-resistant insulation materials such as asbestos, sand, oils and/or refrigerants.

The weight of the filled containers must be sufficient to cause the containers to sink below the surface of the molten lava so that the gradual disintegration, melting or consumption of the containers occurs at least slightly below said surface and, most preferably, deep within the volume of the lava. The minimum weight will vary, depending upon the composition and temperature of the lava, and can be determined by depositing and observing containers of known weight, filled with sand or other harmless material. Generally, the containers conventionally-used for the containment of nuclear and toxic wastes are sufficiently heavy in filled condition, to satisfy the requirements of the present method.

The toxic and nuclear waste may be contained within a binder material, such as cement, which is used to fill the present containers. Binders of different weights and/or containing heavy additives may be used to produce filled containers of any desired or necessary weight, depending upon the composition and density of the lava present within a given volcano.

While a binder such as cement can be considered to be a container for the toxic and nuclear waste, since it can be hardened into any desired compact shape, it is generally preferred for the safety of workers, particularly in the case of radioactive waste, to enclose the waste within preformed containers which provide a high degree of shielding against the escape of dangerous levels of radioactivity.

Most volcanoes are active for brief time periods, after which the surface lava cools and hardens to form a crust or natural lid over the deposited waste which continues to be consumed and dissipated within interior lava which remains hot and liquid for prolonged time periods.

Variations and modifications of the present invention will be apparent to those skilled in the art within the scope of the present claims.

I claim:

1. Process for the safe and convenient disposal of nuclear and/or toxic wastes which comprises the steps of (a) collecting nuclear and/or toxic wastes which pose a danger to health; (b) packaging said wastes within containers for the safe containment thereof to provide filled containers having a weight sufficient to sink into the molten lava present within an active volcano, and (c) depositing said filled containers directly into the molten lava present within a volcano containing same to cause the containers to sink therein end to be dissolved or consumer by the heat, whereby the contents thereof are consumed to become a part of the mass of molten lava present within said volcano.

2. A process according to claim 1 in which said containers are formed of a material selected from the group consisting of concrete, steel, lead, plastic and porcelain.

* * * * *